United States Patent
Ecklund et al.

(10) Patent No.: US 6,931,711 B2
(45) Date of Patent: Aug. 23, 2005

(54) METHODS AND APPARATUS FOR REMOVING GASES FROM ENCLOSURES

(75) Inventors: Steven P. Ecklund, St. Anthony, MN (US); Mark J. Jarrett, Lake Elmo, MN (US); Lisa P. Koland, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 184 days.

(21) Appl. No.: 10/233,814

(22) Filed: Sep. 3, 2002

(65) Prior Publication Data

US 2004/0040941 A1 Mar. 4, 2004

(51) Int. Cl.[7] .................. B23P 21/00; B23P 11/00; B23K 26/00
(52) U.S. Cl. .................. 29/469; 29/428; 219/121.63
(58) Field of Search .................. 29/469, 428, 33 T; 219/121.63; 356/476; 372/94; 313/549, 559

(56) References Cited

U.S. PATENT DOCUMENTS

| | | |
|---|---|---|
| 4,062,319 A | 12/1977 | Roth et al. |
| 4,297,082 A | 10/1981 | Wurtz et al. |
| 4,317,089 A | 2/1982 | Grant, Jr. et al. |
| 4,484,818 A | 11/1984 | Houston |
| 4,595,377 A | 6/1986 | Norvell |
| 4,717,551 A | 1/1988 | Bernauer et al. |
| 4,740,985 A | 4/1988 | Podgorski |
| 4,949,671 A | 8/1990 | Davis et al. |
| 5,056,102 A | 10/1991 | Galbrecht |
| 5,056,920 A | 10/1991 | Ahonen et al. |
| 5,088,825 A | 2/1992 | Derry et al. |
| 5,154,582 A | 10/1992 | Danielson |
| 5,161,955 A | 11/1992 | Danielson et al. |
| 5,456,740 A | 10/1995 | Snow et al. |
| 5,477,716 A | 12/1995 | Snow |
| 5,492,682 A | 2/1996 | Succi et al. |
| 5,731,662 A * | 3/1998 | Parrott et al. ............... 313/549 |
| 5,780,771 A | 7/1998 | Beckwith et al. |
| 5,855,859 A | 1/1999 | Shive et al. |
| 5,929,367 A | 7/1999 | Neff et al. |
| 5,935,340 A | 8/1999 | Xia et al. |
| 6,012,453 A | 1/2000 | Tsals et al. |
| 6,024,775 A | 2/2000 | Miller et al. |
| 6,074,171 A | 6/2000 | Giannantonio et al. |
| 6,077,046 A | 6/2000 | Kennedy et al. |
| 6,110,808 A | 8/2000 | Saito |
| 6,241,477 B1 | 6/2001 | Brezoczky et al. |
| 6,241,955 B1 | 6/2001 | Alvarez, Jr. |
| 6,251,344 B1 | 6/2001 | Goldstein |
| 6,347,636 B1 | 2/2002 | Xia et al. |
| 6,369,442 B1 | 4/2002 | Saito |

OTHER PUBLICATIONS

International Search Report dated Nov. 22, 2004, Application No. PCT/US03/27512, 7 pages.

* cited by examiner

*Primary Examiner*—John C. Hong
(74) *Attorney, Agent, or Firm*—Matthew Luxton, Esq.; Armstrong Teasdale LLP

(57) ABSTRACT

A method for reducing oxidation of indium seals within a substantially sealed housing is disclosed. The method includes installing a getter within the housing, the getter including a getter material to reduce oxygen and water vapor levels within the housing, reducing oxygen and water vapor levels within the housing relative to ambient air, substantially sealing the housing, and activating the getter within the housing.

19 Claims, 4 Drawing Sheets

METHODS AND APPARATUS FOR REMOVING GASES FROM ENCLOSURES

BACKGROUND OF THE INVENTION

This invention relates generally to extending life cycles of products, and more specifically to, methods and apparatus for removal of certain gases from enclosures.

At least one type of known ring laser gyroscope includes electrode seals having a thin layer of indium pressed between an electrode and a glass-ceramic block. Life testing of the gyroscopes has revealed that an effective life of the indium seals are shorter for samples tested in air, as opposed to samples tested in a dry nitrogen environment. In another test, the life of the indium seal was shorter for a sample tested in a higher humidity (water vapor) level, as compared to an indium seal sample located in a vacuum baked housing that was substantially sealed and having a dry nitrogen backfill.

It is believed that the shorter life of the indium seal is caused by corrosion of the seal originating at exposed outer diameters of the seal. The hypothesis has been supported by testing in an oxygen rich environment which shows that the corrosion moves radially inward from an outside diameter of the seal annulus. The corrosion can eventually breach the annular width of the seal and cause a leak between a low-pressure laser cavity, within the glass-ceramic block, and the ambient atmosphere. The leak eventually renders the gyroscope inoperative.

Current methods of reducing oxygen at the exposed outside diameter of an indium seal include vacuum baking a gyroscope housing to reduce humidity, backfilling the housing with dry nitrogen after the vacuum baking, and substantially sealing the housing. However, gases and humidity tend to penetrate the housing seals over the course of time, exposing the indium seals within the housing to air (oxygen) and humidity.

BRIEF SUMMARY OF THE INVENTION

In one aspect, a method for reducing oxidation of indium seals within a substantially sealed housing is provided. The method comprises installing a getter, the getter including a getter material to reduce oxygen and water vapor within the housing, reducing oxygen and water vapor levels within the housing relative to ambient air, substantially sealing the housing, and activating the getter within the housing.

In another aspect, a ring laser gyroscope is provided which comprises a gyroscope assembly, a housing, and a getter. The gyroscope assembly incorporates indium seals and the housing is configured to accept the gyroscope assembly within a cavity of the housing, which is configured to be substantially sealed. The getter is configured to be mounted within the housing and comprises a getter material to remove oxygen and water vapor from the cavity of the housing.

In still another aspect, a housing for a ring laser gyroscope is provided. The housing comprises a first portion, a second portion configured to mate with the first portion in order to define a cavity, and a getter configured to be mounted within the housing. The housing cavity is configured to be substantially sealed, and the getter comprises a getter material to remove oxygen and water vapor from the cavity of the housing.

In yet another aspect, a method for reducing oxygen and water vapor levels within a substantially sealed housing is provided. The method comprises installing a getter, the getter including a getter material to reduce oxygen and water vapor levels within the housing, sealing the housing, and activating the getter within the housing.

DETAILED DESCRIPTION OF THE INVENTION

Figure 1:
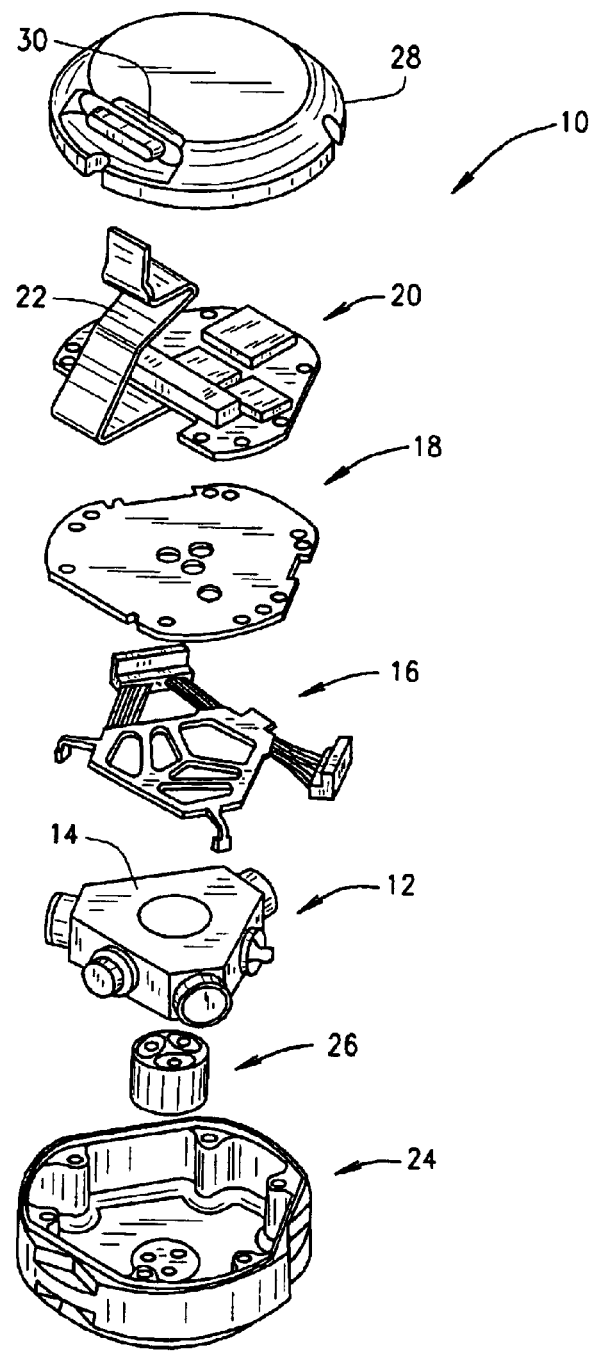
FIG. 1 is an exploded view of a ring laser gyroscope including a housing and support assembly.

FIG. 1 illustrates an exploded view of an exemplary ring laser gyroscope assembly 10. Assembly 10 is generally comprised of a laser assembly 12 including a laser block 14. Assembly 10 also includes a wire harness assembly 16, a support plate 18, an electronics circuit card 20, which includes a flexible conductor 22 for interconnection to an outside system (not shown). Examples of such outside systems include an aircraft avionics suite or a missile guidance system. Assembly 10 further includes a cup shaped housing 24, a dither suspension mechanism 26, and a cover 28. Laser assembly 12 is suspended by dither suspension mechanism 26 between support plate 18 and housing 24. Wire harness 16 is attached to laser assembly 12 to provide electrical signals from electronics card 20 to various components of laser assembly 12. Cover 28 includes an opening 30 into which a connector may be mounted, for the interconnection of gyroscope assembly 10 to other systems. Alternatively, individual conductors may be passed through opening 30 to make the interconnections. Whether used with individual conductors or with a connector, opening 30 is sealed, to try to prevent air and moisture from entering assembly 10.

Figure 2:
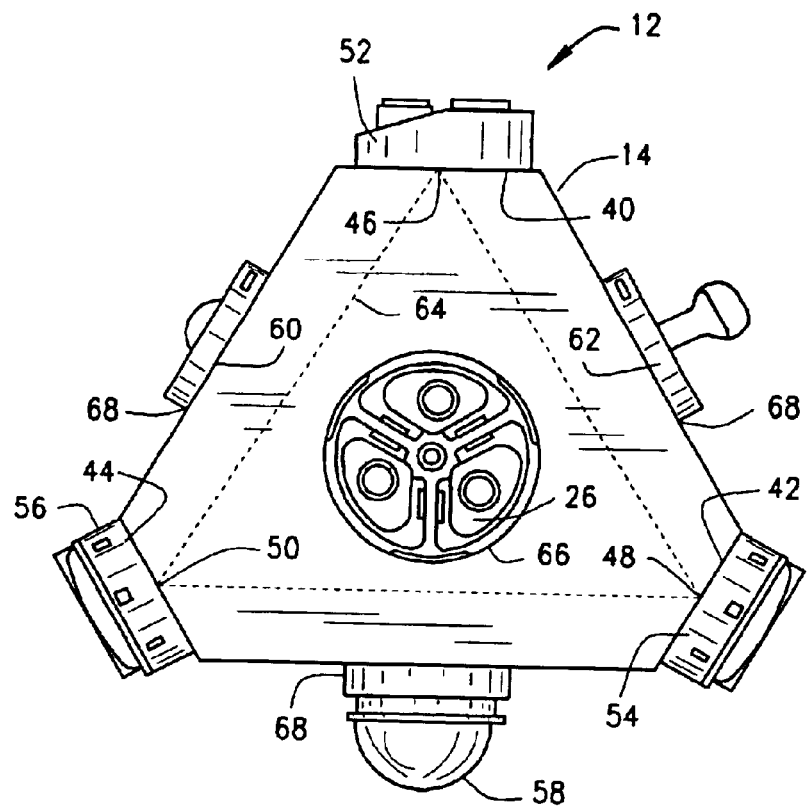
FIG. 2 is a top plan view of a ring laser block.

FIG. 2 illustrates laser block 14 which is constructed of a glass-ceramic material and provides a ring laser cavity containing a lasing gas. Between block surfaces 40, 42, and 44 is a plurality of tunnels or cavities (not shown) having a polygon shape in the form of a triangle, in the embodiment shown, with vertices 46, 48, and 50. Mirror assemblies 52, 54, and 56 are mounted to block surfaces 40, 42, and 44, respectively. The tunnels or cavities are filled with a lasing gas and ignited or excited by a sufficient voltage between a cathode 58 and each of a pair of anodes 60 and 62. In turn, a pair of laser beams will counter-propagate along an optical ring path 64 within the laser cavity. Ring laser optical path 64 establishes a ring lasing plane defined by the three vertices 46, 48, and 50, and also circumscribes an aperture 66 in laser block 14, which receives dither suspension mechanism 26. Cathode 58 and anodes 60 and 62 are mounted to laser block 14 through utilization of a seal 68. In the exemplary embodiment, seal 68 is an indium seal.

Pure indium is very ductile (i.e. yields at a low stress value) and readily wets metals and ceramic oxide materials, and therefore is well suited for vacuum sealing applications. A typical vacuum seal requires clean bonding surfaces, clean indium, and a smooth surface finish. A gasket (seal) of indium is placed between the surfaces to be sealed, and sufficient force is applied to spread the indium across a surface to be sealed. The spreading process breaks up an oxide layer on the indium and brings unoxidized indium into contact with the substrate materials. The indium bonds to the substrates, in this case laser block 14 and cathode 58 or anodes 60 and 62, to form an airtight seal.

Figure 3:
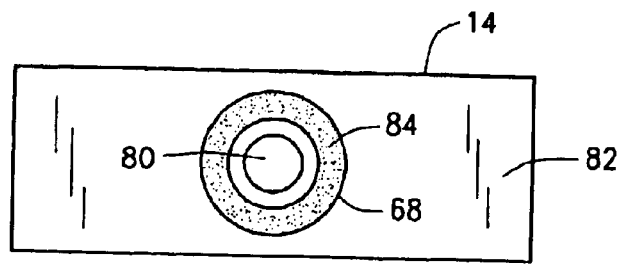
FIG. 3 is a top plan view of an indium seal.

FIG. 3 illustrates an exemplary seal 68 which surrounds a tunnel or cavity 80 that is located along a side surface 82 of laser block 14, with cathode 58 (shown in FIG. 2) or anode 60 or 62 (both shown in FIG. 2) removed for clarity. Seal 68 includes a non-corroded area 84. Seal 68 is configured to prevent entry of air, humidity, and other contaminants into tunnel 80. Seal 68 is in good condition and shows no corrosion activity.

Figure 4:
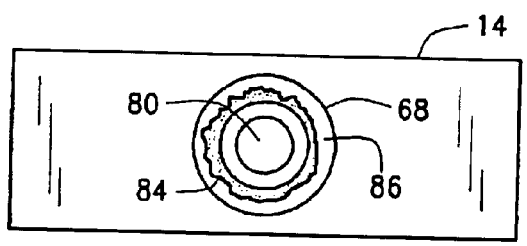
FIG. 4 is a top plan view of an indium seal which has been somewhat exposed to oxygen or water vapor.

FIG. 4 is an illustration of seal 68 for tunnel 80 as corrosion (oxidation) activities take place due to exposure to oxygen or humidity. Seal 68 includes a non-corroded area 84 and a corroded area 86. As an outer perimeter of seal 68 is not in contact with side surface 82 of laser block 14 or cathode 58 or one of anodes 60 and 62, the outer perimeter is susceptible to exposure to surrounding elements. Therefore, corrosion of seal 68 begins at the outer perimeter.

Figure 5:
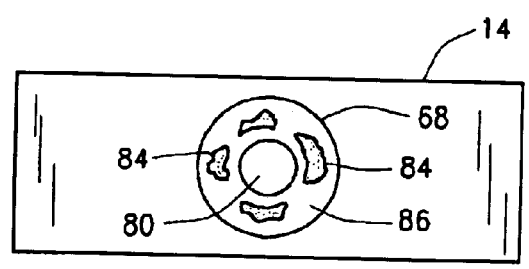
FIG. 5 is a top plan view of an indium seal which has been extensively exposed to oxygen or water vapor.

FIG. 5 illustrates a seal 68 which has been heavily damaged by corrosion. Non-corroded areas 84 no longer provide a seal for opening 80 as corroded area 86 forms most of seal 68.

Therefore, the life of an indium seal can be extended by preventing or reducing oxidation of the indium after seal 68 is formed. Typical ring laser gyroscopes include an indium seal 68 which bonds dissimilar substrate materials together (i.e., an electrode of aluminum or beryllium, and a zero-expansion glass ceramic). Since coefficients of thermal expansion for the two substrate materials are different, temperature cycling creates thermal stress that tend to cause the indium to yield across an annular width of seal 68. Indium does not work harden, rather, it is self-annealing, and seal 68 will remain leak tight in spite of thermally induced yielding. Indium is readily oxidized. However, indium oxide is not self-annealing. If oxygen is present, an outer perimeter of seal 68 will become oxidized, and the oxidation of seal 68 allows propagation of a fracture from the outer perimeter to an inner perimeter of seal 68.

Figure 6:
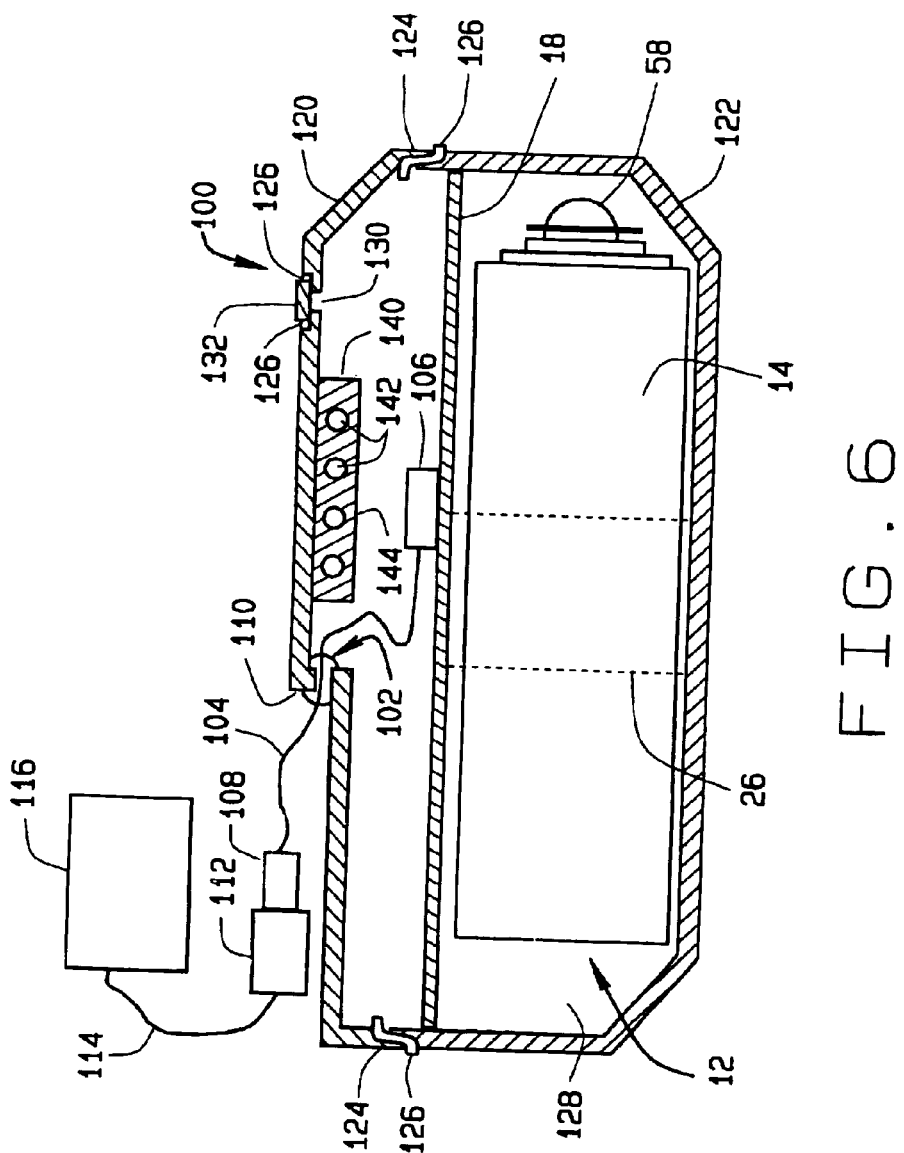
FIG. 6 is a cross sectional schematic view of a housing which includes a ring laser gyroscope assembly and a getter including a getter material to remove oxygen and water vapor from the housing.

FIG. 6 is an illustration of a housing 100 which is configured to house laser assembly 12, wire harness assembly 16 (shown in FIG. 1), support plate 18, electronics circuit card 20 (shown in FIG. 1), and dither suspension mechanism 26. For simplicity, only laser assembly 12 and support plate 18 are shown within housing 100. Housing 100 is functionally similar to housing 24 and cover 28 (both shown in FIG. 1) as housing 100 is also hermetically sealed to protect the electrical and optical equipment within.

Housing 100 includes an opening 102 through which a signal conductor 104, for example, flexible conductor 22 (shown in FIG. 1) passes. Signal conductor 104 extends from a connector assembly 106, which may be a portion of wire harness assembly 16 or electronics circuit card 20, through opening 102 to an external connector assembly 108. Opening 102 is sealed with a plug 110, which also engages signal conductor 104 in forming the seal. External connector assembly 108 is coupled to a connector 112 which provides interconnection to a conductor assembly 114 to provide signals to an external device 116, for example, other electronics within an aircraft avionics system.

Housing 100 includes a first portion 120 and a second portion 122 which are joined together at an interconnection 124 by welding or through utilization of an adhesive 126, which forms at least a portion of an hermetic seal for housing 100. First portion 120 and second portion 122, when joined together, form an interior cavity 128 within housing 100. In one embodiment, interior cavity 128 is filled with a dry nitrogen or other gas through a backfill opening 130 before opening 130 is filled with a plug 132, which is held in place with adhesive 126. However, adhesive 126 and plugs 108 and 130 only provide a substantial sealing, not an absolute sealing, of housing 100. As time passes, housing 100 will begin to accumulate ambient air (oxygen) and humidity.

Housing 100 further includes a getter 140, which in the embodiment shown, is attached to first portion 120 of housing 100. Getter 140 includes well known getter materials, for example, an active metal material which eliminates or reduces levels of water vapor (humidity) and oxygen within cavity 128 of housing 100. In one embodiment, the getter material reduces the levels of water vapor and oxygen through a chemical reaction with the water vapor and oxygen. One group of known getter materials includes zirconium alloys. Over time, adhesive 126 will allow air and water vapor to enter the nitrogen filled environment of cavity 128, thereby causing damage, in the form of oxidation, to indium seals 68 (shown in FIGS. 2–5) which form a portion of gyroscope assembly 10 as above described. Getter 140 counteracts this seepage of air (oxygen) and water vapor, through the chemical reaction of the getter material with the water vapor and oxygen as described above, thereby reducing oxidation of the seals and adding to a useful life of gyroscope assembly 10.

In one embodiment, getter 140 includes a chemical purifier 142, for example, the active metal material in a pelletized form, which is installed into a fixture 144. Fixture 144 is then mounted into housing 100. In an alternative embodiment, (not shown) getter 140 includes a getter material, for example, an active metal material, that is heated utilizing an electrical current. Once heated, the material will react with oxygen and water vapor, removing the oxygen and water vapor from the atmosphere of housing 100. In any of the above described embodiments, fixture can be either of a screen which wraps around purifier 142 and a tube within housing 100.

In alternative embodiments, purifier 142 comprises a flowthrough material or a fusion material. Getter 140 therefore removes oxygen from housing 100 by reacting with the oxygen or water vapor thereby purifying the fill gas (dry nitrogen or other non-oxidizing fill gas) within cavity 128. An alternative embodiment of getter 140 includes a getter material (not shown) which is utilized in gas chromatograph purifiers as an oxygen and moisture (water vapor) trap.

Deployment of a getter 140 in a housing 100 therefore provides an active mechanism to extend the life of certain components, both electrical, and electro-optical, which can be damaged by exposure to air (oxygen) and humidity, by extending the life of an indium seal utilized to protect such components. In one exemplary embodiment, an active getter provides a favorable environment for extending the life of an indium seal which is enclosed within a hermetically sealed housing as that seal is inevitably permeated by oxygen and water vapor.

While the invention has been described in terms of various specific embodiments, those skilled in the art will recognize that the invention can be practiced with modification within the spirit and scope of the claims.

What is claimed is:

1. A method for reducing oxidation of indium seals within a substantially sealed housing, said method comprising:
   installing a getter within the housing, the getter including a getter material to reduce oxygen and water vapor levels within the housing;
   reducing oxygen and water vapor levels within the housing relative to ambient air;
   substantially sealing the housing; and
   activating the getter within the housing.

2. A method according to claim 1 wherein activating the getter comprises heating getter material with an electrical current.

3. A method according to claim 1 wherein installing a getter within the housing comprises:
   installing the getter within a fixture; and
   mounting the fixture within the housing.

4. A method according to claim 3 wherein installing the getter within a fixture comprises wrapping the getter in a screen.

5. A method according to claim 3 wherein the fixture is a tube.

6. A method according to claim 1 wherein the getter is one of an active metal material, a flowthrough material, and a fusion material.

7. A method according to claim 1 wherein the getter is configured to reduce oxygen and water vapor levels within the housing by purifying a non-oxidizing back fill gas within the housing.

8. A ring laser gyroscope comprising:
   a gyroscope assembly comprising at least one indium seal;
   a housing configured to accept said gyroscope assembly within a cavity of said housing, said housing configured to be substantially sealed; and
   a getter mounted within said housing, said getter comprising a getter material to remove oxygen and water vapor from the cavity of said housing.

9. A ring laser gyroscope according to claim 8 wherein said getter material is configured to be activated using an electrical current.

10. A ring laser gyroscope according to claim 8 further comprising a fixture within said housing, said fixture configured to hold said getter.

11. A ring laser gyroscope according to claim 10 wherein said fixture comprises a screen.

12. A ring laser gyroscope according to claim 10 wherein said fixture comprises a tube within said housing.

13. A ring laser gyroscope according to claim 8 wherein said getter is one of an active metal material, a flowthrough material, and a fusion material.

14. A ring laser gyroscope according to claim 8 wherein said getter material is configured to purify a non-oxidizing backfill gas within said housing.

15. A housing for a ring laser gyroscope comprising:
   a first portion;
   a second portion, configured to mate with said first portion in order to define a substantially sealed cavity; and
   a getter mounted within said housing, said getter comprising a getter material to remove oxygen and water vapor from the cavity of said housing.

16. A housing according to claim 15 wherein to substantially seal said housing, said housing is configured to be back filled with dry non-oxidizing backfill gas and hermetically sealed.

17. A housing according to claim 15 wherein said getter material is configured to be heated using an electrical current.

18. A housing according to claim 15 further comprising a fixture, said fixture configured to be contained within the cavity of said housing, said fixture configured to hold said getter.

19. A housing according to claim 15 wherein said getter is one of an active metal material, a flowthrough material, and a fusion material.

* * * * *